(12) United States Patent
Stanley

(10) Patent No.: US 6,676,160 B2
(45) Date of Patent: Jan. 13, 2004

(54) REAR FRAME RAIL THAT INCORPORATES LEAF SPRING CLEARANCE ZONE

(75) Inventor: John Wesley Stanley, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/682,318

(22) Filed: Aug. 20, 2001

(65) Prior Publication Data

US 2003/0034643 A1 Feb. 20, 2003

(51) Int. Cl.[7] ............................................. B62D 21/00
(52) U.S. Cl. ................ 280/797; 180/311; 280/124.163; 280/124.17; 280/124.175; 280/798
(58) Field of Search ................................. 280/781, 788, 280/797, 124.163, 124.17, 124.175, FOR 175, FOR 178, 798; 180/311

(56) References Cited

U.S. PATENT DOCUMENTS

| | | | | |
|---|---|---|---|---|
| 1,859,182 A | * | 5/1932 | Tibbetts | |
| 2,221,488 A | * | 11/1940 | Paton | |
| 4,277,087 A | | 7/1981 | Turner et al. | |
| 5,335,934 A | | 8/1994 | Hiller | |
| 5,636,857 A | | 6/1997 | Tandy, Jr. et al. | |
| 5,887,881 A | | 3/1999 | Hatch | |
| 5,938,221 A | * | 8/1999 | Wilson | 280/124.163 |

FOREIGN PATENT DOCUMENTS

IT 369271 * 3/1939 ................. 280/788

* cited by examiner

Primary Examiner—Eric Culbreth
(74) Attorney, Agent, or Firm—Gregory P. Brown

(57) ABSTRACT

A frame including a pair of rear frame rails having a front bracket and a rear bracket. A leaf spring is connected at a front end to each front bracket and at a rear end to each rear bracket, with the leaf spring having a longitudinal direction between the front bracket and the rear bracket. The longitudinal direction of the leaf spring is non-parallel to the rear frame rails. Each rear frame rail includes a notch extending between the outside face of the rear frame rails and the bottom face of the rear frame rails. The notch allows the leaf spring to rise to a level above the bottom face of the rear frame rails during jounce. The frame also includes an axle perpendicular to the leaf spring. A pair of shock absorbers are connected to the axle and an outside face of the rear frame rails.

19 Claims, 7 Drawing Sheets

REAR FRAME RAIL THAT INCORPORATES LEAF SPRING CLEARANCE ZONE

BACKGROUND OF INVENTION

The present invention relates to a vehicle frame and, more particularly, to a rear frame axle suspension.

Vehicles currently have rear frame axle suspensions that allow a rear axle of the vehicle to move vertically relative to the vehicle. Rear tires and the rear axle of the vehicle can therefore travel over bumps in the road without fully transferring the vertical movement from the rear tires and the rear axle to passengers in the vehicle. The rear axle of the vehicle also has shock absorbers that dampen the vertical movement of the axle, thereby damping any vertical force from the rear axle and providing for a smoother ride for the passengers in the vehicle.

Heretofore, rear frame axle suspensions 1 (see FIG. 1) have included a pair of rear frame rails 2 that converge towards the rear of the vehicle. Each of the rear frame rails 2 typically has included a pair of side shackles 3 connected to outside faces 4 of the rear frame rails 2. The pair of shackles 3 retain the leaf springs 5 parallel to the rear frame rails 2. The leaf springs 5 are also connected to a rear axle housing 6 encasing the rear axle (not shown) by U-bolts 9. The leaf springs 5 are not perpendicular to the rear axle housing 6. The leaf springs 5 allow for relative movement between the rear axle housing 6 and the body and frame of the vehicle. However, since the leaf springs 5 are not perpendicular to the rear axle housing 6, the movement of the rear axle housing 6 causes a side load on the leaf springs 5 and the U-bolts 9. Additionally, shock absorbers 7 have typically been connected to the rear axle housing 6 inboard of the rear frame rails 2 and to inside faces 8 of the rear frame rails 2 to dampen the vertical movement of the vehicle. The shock absorbers 7 dampen any vertical force transferred from the rear axle housing 6 to the rear frame rails 2.

SUMMARY OF INVENTION

One aspect of the present invention is to provide a rear frame axle suspension comprising a pair of rear frame rails having a front bracket and a rear bracket connected thereto. Each front bracket is connected to a bottom of the rear frame rails and each rear bracket is connected to an outside face of the rear frame rails. A pair of leaf springs are connected at a front end to the front bracket and at a rear end to the rear bracket of each rear frame rail. The leaf springs have a longitudinal direction between the front bracket and the rear bracket. The leaf springs are nonparallel to the rear frame rails. An axle housing is connected to the leaf springs, with the axle housing being adapted to contain at least one axle having an axis of rotation perpendicular to the longitudinal direction of the leaf springs. The rear frame axle suspension also includes a pair of shock absorbers. Each shock absorber is connected to one of the rear frame rails at a first connection point and to the axle housing at a second connection point, with the rear frame rails being located between the first connection points.

Another aspect of the present invention is to provide a rear frame axle suspension including a pair of rear frame rails, each rear frame rail including an outside face, an inside face, a bottom face and a top face. A front bracket and a rear bracket are attached to each rear frame rail. A pair of leaf springs are each connected at a front end to the front bracket at a front end bracket connection point and at a rear end to the rear bracket at a rear end bracket connection point for each rear frame rail. Each leaf spring has a longitudinal direction between the front bracket and the rear bracket, with the longitudinal direction of each leaf spring being non-parallel to the rear frame rails. Each rear frame rail includes a notch extending between the outside face of the rear frame rails and the bottom face of the rear frame rails. The notches allow the leaf spring to rise to a level above the bottom face of the rear frame rails during jounce.

Yet another aspect of the present invention is to provide a vehicle frame including a pair of frame rails, with each rear frame rail having an outside face, an inside face, a bottom face and a top face. A front bracket is connected to each rear frame rail, with each front bracket being connected to the bottom face of the rear frame rails. A rear bracket is connected to each rear frame rail, with each rear bracket being connected to the outside face of the rear frame rails. A pair of leaf springs are each connected at a front end to the front bracket at a front end bracket connection point and at a rear end to the rear bracket at a rear end bracket connection point. The leaf springs have a longitudinal direction between the front bracket and the rear bracket, with the longitudinal direction of the leaf springs being non-parallel to the rear frame rails. An axle housing is connected to the leaf springs, with the axle housing being adapted to contain at least one axle having an axis of rotation perpendicular to the longitudinal direction of the leaf springs. The rear frame axle suspension also includes a pair of shock absorbers. Each shock absorber is connected to one of the rear frame rails at a first connection point and to the axle housing at a second connection point, with the rear frame rails being located between the first connection points. The frame rails each include a notch extending between the outside face of the frame rails and the bottom face of the frame rails. The notches allow the leaf springs to rise to a level above the bottom face of the rear frame rails during jounce.

Accordingly, the vehicle suspension provides for a more durable suspension and a longer life for the leaf springs. Furthermore, the vehicle suspension provides for an increased roll ratio compared to the prior art roll ratio for roll damping of the vehicle. The vehicle suspension is efficient in use, economical to manufacture, capable of a long operable life, and particularly adapted for the proposed use.

These and other features, advantages, and objects of the present invention will be further understood and appreciated by those skilled in the art by reference to the following specification, claims and appended drawings.

DETAILED DESCRIPTION

Figure 1:
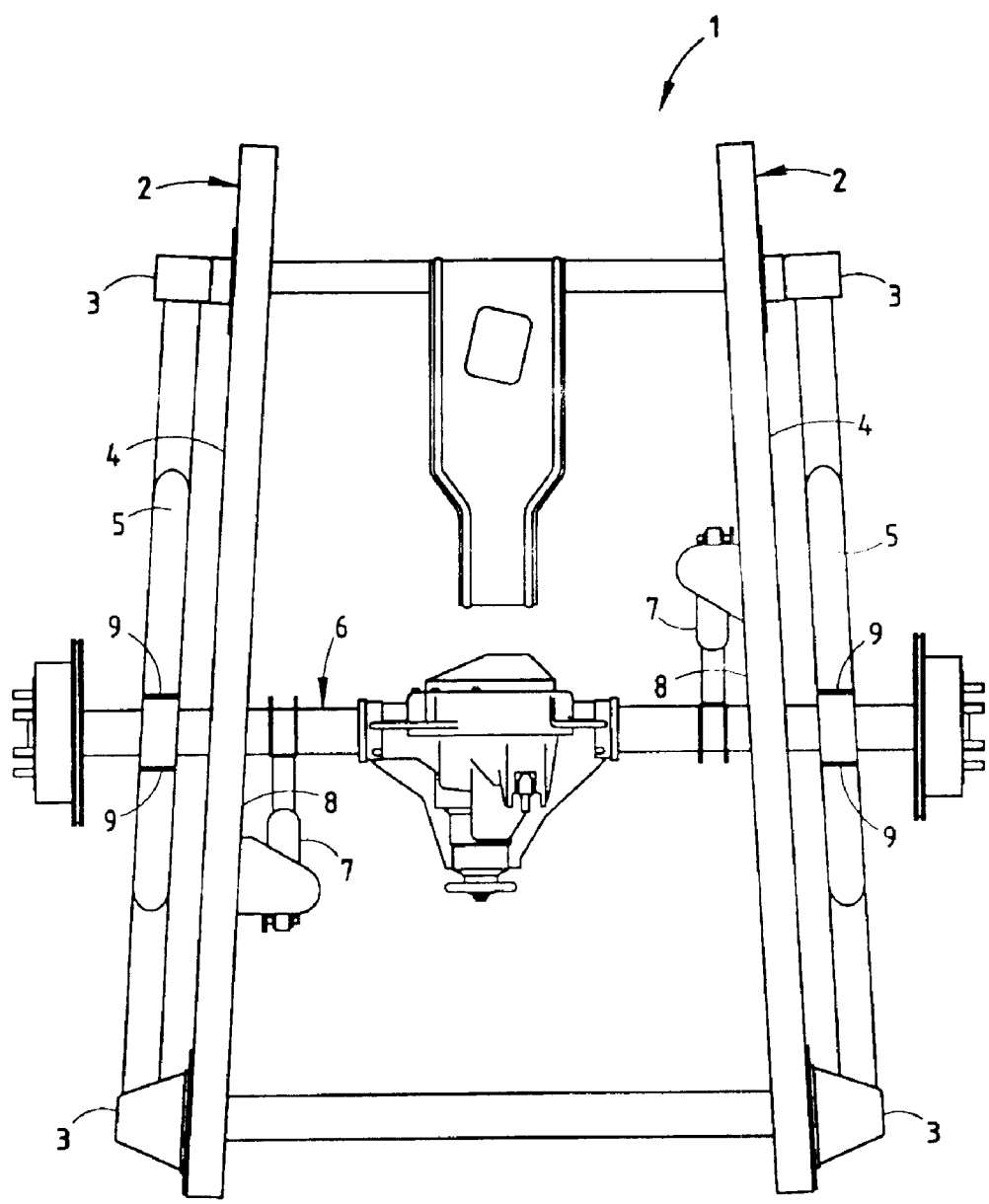
FIG. 1 is a plan view of a prior art rear axle suspension.
Figure 2:
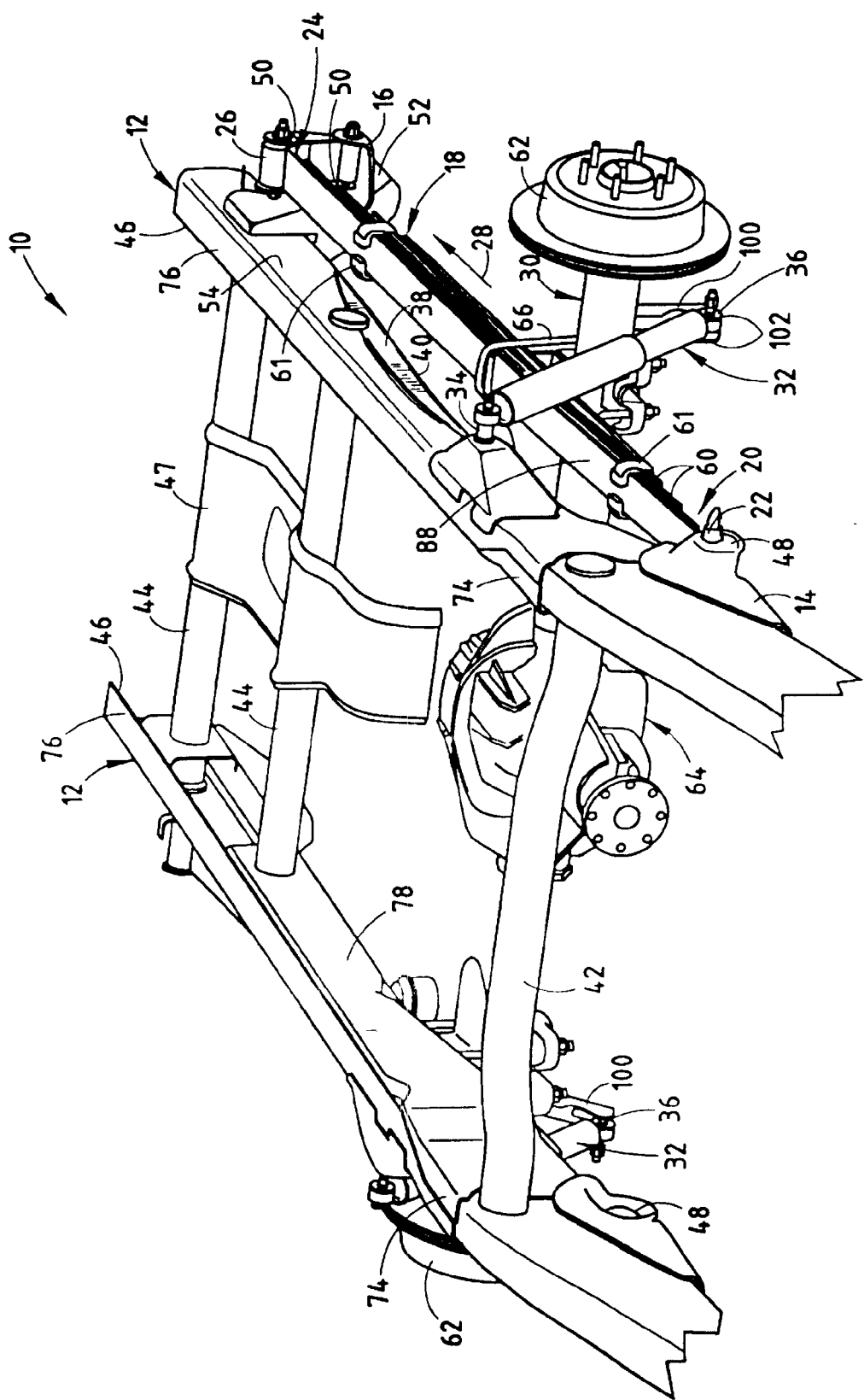
FIG. 2 is a perspective view of a vehicle frame of the present invention.

For purposes of description herein, the terms upper, lower, right, left, rear, front, vertical, horizontal, and derivatives thereof shall relate to the invention as orientated in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 3:
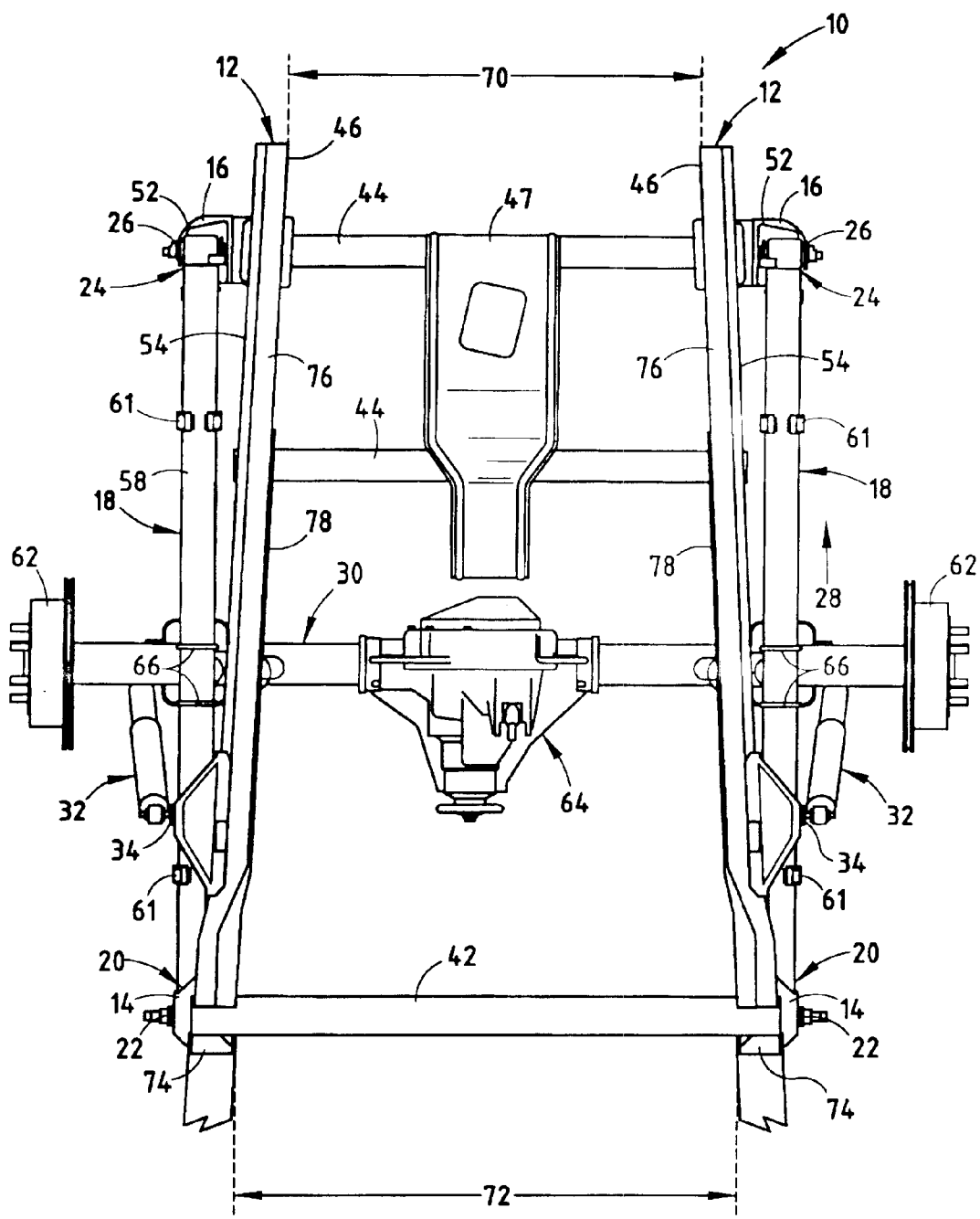
FIG. 3 is a plan view of the vehicle frame of the present invention.
Figure 4:
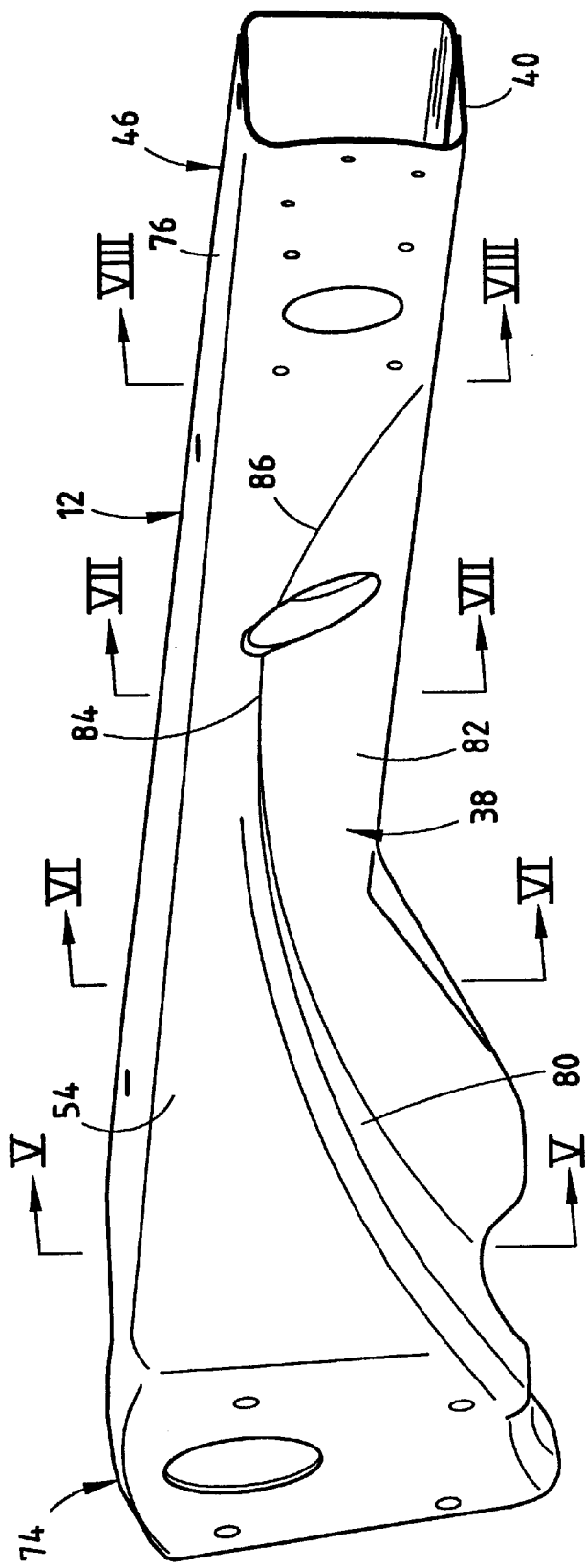
FIG. 4 is a perspective view of a rear frame rail of the vehicle frame of the present invention.
Figure 5:
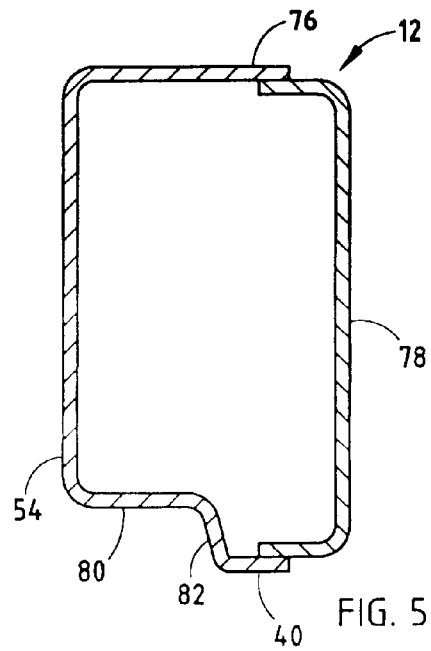
FIG. 5 is a cross-sectional view of the rear frame rail of the vehicle frame of the present invention taken along line V—V of FIG. 4.
Figure 6:
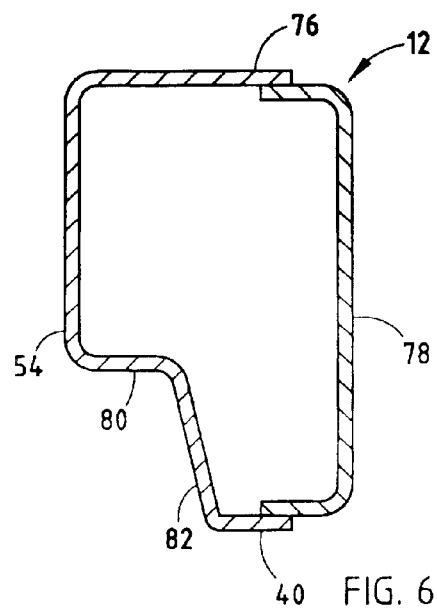
FIG. 6 is a cross-sectional view of the rear frame rail of the vehicle frame of the present invention taken along line VI—VI of FIG. 4.
Figure 7:
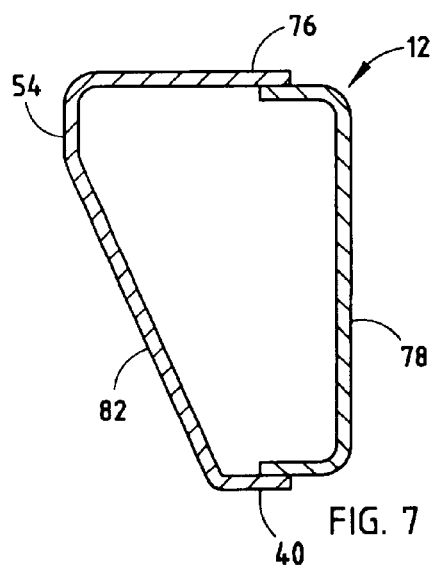
FIG. 7 is a cross-sectional view of the rear frame rail of the vehicle frame of the present invention taken along line VII—VII of FIG. 4.
Figure 8:
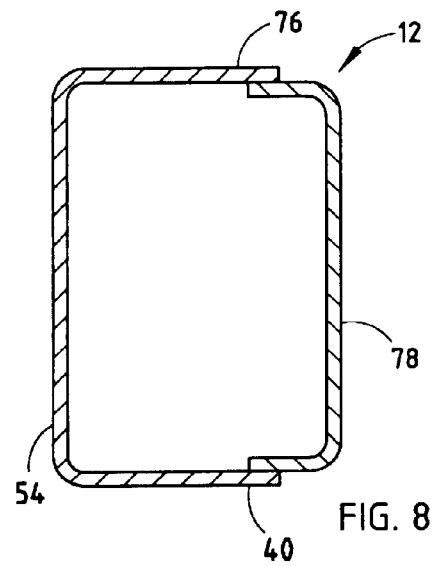
FIG. 8 is a cross-sectional view of the rear frame rail of the vehicle frame of the present invention taken along line VIII—VIII of FIG. 4.

The reference number 10 (Figs.2 and 3) generally designates a vehicle frame embodying the present invention. In the illustrated example, the vehicle frame 10 includes a pair of rear frame rails 12, a front bracket 14 attached to each rear frame rail 12, a rear bracket 16 attached to each rear frame rail 12 and a pair of leaf springs 18. Each leaf spring 18 is connected at a front end 20 to the front bracket 14 at a front end bracket connection point 22 and at a rear end 24 to the rear bracket 16 at a rear end bracket connection point 26 for each rear frame rail 12. Each leaf spring 18 has a longitudinal direction 28 between the front bracket 14 and the rear bracket 16, with the longitudinal direction 28 of each leaf spring 18 being non-parallel to the rear frame rails 12. The vehicle frame 10 also includes an axle housing 30 connected to the leaf springs 18, with the axle housing 30 positioned perpendicular to the leaf springs 18. The vehicle frame 10 further includes a pair of shock absorbers 32, with each shock absorber 32 being connected to one of the rear frame rails 12 at a first connection point 34 and to the axle housing 30 at a second connection point 36. The rear frame rails 12 are located between the first connection points 34. Each rear frame rail 12 includes a notch 38 in the rear frame rails 12. The notches 38 allow the leaf springs 18 to rise to a level above a bottom face 40 of the rear frame rails 12 during jounce.

The illustrated vehicle frame 10 is preferably used for pick-up trucks, but may be used in any vehicle. The rear frame rails 12 are located at a rear end of the pick-up truck and are located under the bed of the truck. The rear frame rails 12 converge towards each other at a rear end 46 of the rear frame rails 12. Therefore, a rear distance 70 between the rear ends 46 of the rear frame rails 12 is smaller than a front distance 72 between front ends 74 of the rear frame rails 12. The rear frame rails 12 converge to allow for a larger fuel tank between the rear frame rails 12, but allow the bumper connection (now shown) at the rear end 46 of the rear frame rails 12 to connect to prior art bumpers. The rear frame rails 12 preferably have a tubular configuration and include a top face 76, the bottom face 40, an outside face 54 and an inside face 78. The vehicle frame 10 also includes a front tubular cross-member 42 extending between the rear frame rails 12 below a front part of the pick-up truck bed and a pair of tubular rear cross-members 44 adjacent the rear end 46 of the rear frame rails 12. The pair of rear cross-members 44 are used to provide rigidity to the vehicle frame 10 and are typically used to support an auxiliary tire (not shown) on a tire support 47 extending between the pair of rear cross-members 44. The vehicle frame 10 preferably is used in a vehicle with rear wheel drive.

In the illustrated example, the vehicle frame 10 includes the leaf spring 18 connected to the rear frame rails 12 by the front bracket 14 and the rear bracket 16. The front bracket 14 preferably is a fixed shackle having a pair of parallel links 48 connected to the leaf spring 18 and to the rear frame rail 12 adjacent the front tubular cross-member 42. The links 48 of the front bracket 14 are preferably fixed to the bottom face 40 of the rear frame rails 12 and are maintained in a fixed position relative to the rear frame rails 12. The rear bracket 16 is also preferably a shackle having a shackle housing 52 fixed to the outside face 54 of the rear frame rails 12 adjacent the rearmost rear cross-member 44. The rear bracket 16 also includes a pair of parallel links 50 connected to the shackle housing 52. The links 50 of the rear bracket 16 pivot within the bracket housing 52 about an axis perpendicular to the longitudinal direction 28 of the leaf spring 18. The leaf spring 18 is therefore connected at a front end connection point to the front bracket 14 and a rear end connection point to the rear bracket 16.

The illustrated leaf spring 18 preferably includes a plurality of leaf springs comprising a main leaf spring 58 and one or more cooperating leaf springs 60. The main leaf spring 58 and the cooperating leaf springs 60 are preferably connected with a strap (not shown) or clinch 61 that allows the main leaf spring 58 and the cooperating leaf springs 60 to move relative to each other. Although one main leaf spring 58 and one cooperating leaf spring 60 are shown, the term leaf spring 18 as used herein can include only the main leaf spring 58 or the main leaf spring 58 and any number of cooperating leaf springs 60. The main leaf spring 58 includes a spring eye at each end for connecting the main leaf spring 58 to the front bracket 14 and the rear bracket 16. A rod (not shown) connected to the links 48 of the front bracket 14 extends through the spring eye at the front of the main leaf spring 58 at the front end bracket connection point 22. Likewise, a rod (not shown) connected to the links 50 of the rear bracket 16 extends through the spring eye at the rear of the main leaf spring 58 at the rear end bracket connection point 26. The spring eyes at the front and the rear of the main leaf spring 58 are allowed to rotate about the rods of the front bracket 14 and the rear bracket 16 as is known to those skilled in the art.

In the illustrated example, the axle housing 30 is connected to each of the leaf springs 18. The axle housing 30 is tubular and contains a pair of rear axles (not shown) within the axle housing 30. Each rear axle includes a hub 62 at each outside end for engagement with rear tires (not shown) of the vehicle. When the vehicle has rear wheel drive, the axle housing 30 also includes a differential case 64 connected by a propeller shaft to an engine of the vehicle for propelling the vehicle. The differential case 64 includes a system of gears capable of dividing the input torque of the propeller shaft between the rear axles where rotation at different speeds is likely to occur. The axle housing 30 is also preferably connected to the leaf springs 18 at approximately the midpoint of the leaf springs 18 by a U-shaped axle bracket 66 that surrounds the leaf springs 18. The axle housing 30 is therefore connected to the rear frame rails 12 by the axle bracket 66, the leaf springs 18, the front bracket 14 and the rear bracket 16. The leaf springs 18 allow the axle housing 30 to move towards and away from the rear frame rails 12, typically during jounce of the vehicle frame 10.

The illustrated rear frame rails 12 (FIGS. 4–8) preferably include the notch 38 in the rear frame rail 12 between the outside face 54 and the bottom face 40 of the rear frame rail 12. The notch 38 begins adjacent the front end 74 of the rear frame rail 12 and continues towards the rear end 46 of the rear frame rail 12. The notch 38 includes an arcuate top portion 80 that tapers towards the rear end 46 of the rear frame rail 12. The notch 38 also includes a side portion 82 connecting the top portion 80 of the notch 38 to the bottom face 40 of the rear frame rail 12. The top portion 80 is substantially horizontal in cross-section (see FIG. 5–8) and the side portion 82 has an increasing slope towards the rear end 46 of the rear frame rail 12. The side portion 82 of the notch 38 continues towards a vertical plane moving in a direction towards the rear end 46 of the rear frame rail 12 after the top portion 80 has tapered to a point 84. The top portion 80 and a top edge 86 of the side portion 82 after the top portion 80 has tapered to the point 84 define a continuous arc between the front end connection point of the leaf spring 18 and the rear end connection point of the leaf spring 18.

In the illustrated example, the shock absorbers 32 are vibration dampers that will dampen any force transferred from the axle housing 30 to the rear frame rails 12. The shock absorbers 32 are preferably telescoping tubes and are well known to those skilled in the art. Each shock absorber 32 is connected to one of the rear frame rails 12 at the first connection point 34 and to the axle housing 30 at the second connection point 36. The rear frame rails 12 are located between the first connection points 34. The shock absorbers 32 are preferably pivotally connected to the outside face 54 of the rear frame rails 12 at the first connection point 34. The shock absorbers 32 also preferably extend downward and towards the rear end 46 of the rear frame rails 12 from the first connection point 34 towards the second connection point 36 on the axle housing 30. The axle housing 30 preferably includes a downwardly and forwardly extending arm 100 having the second connection point 36 located at an end thereof. The arm 100 of the axle housing 30 includes a pair of parallel fingers 102 at an end and a rod (not shown) extending between the fingers 102. An eyehole (not shown) is located on the shock absorber 32 at the second connection point 36. The rod of the arm 100 of the axle housing 30 extends through the eyehole of the shock absorber 30, thereby allowing the shock absorber 32 to rotate about the arm 100. Consequently, the shock absorber 30 can rotate relative to the axle housing 30. When the axle housing 30 moves towards the rear frame rails 12, the shock absorbers 32 will rotate upward about the first connection point 34 and downward about the second connection point 36. The first connection point 34 and the second connection point 36 will also move closer, thereby telescoping the shock absorbers 32 and dampening the force from the axle housing 30.

Figure 9:
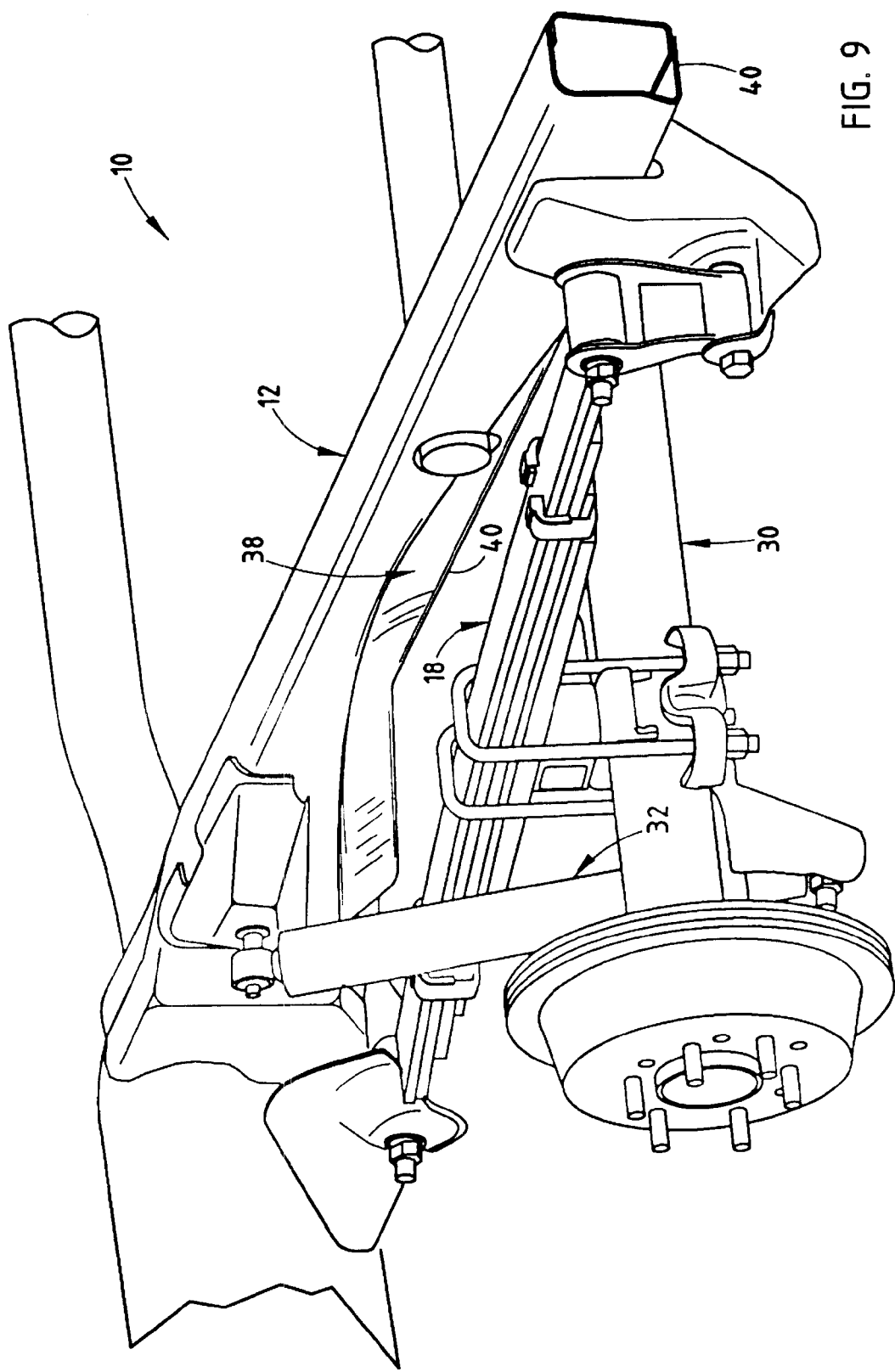
FIG. 9 is a perspective view of a rear axle e suspension of the present invention when the suspension is at a bottom of jounce.
Figure 10:
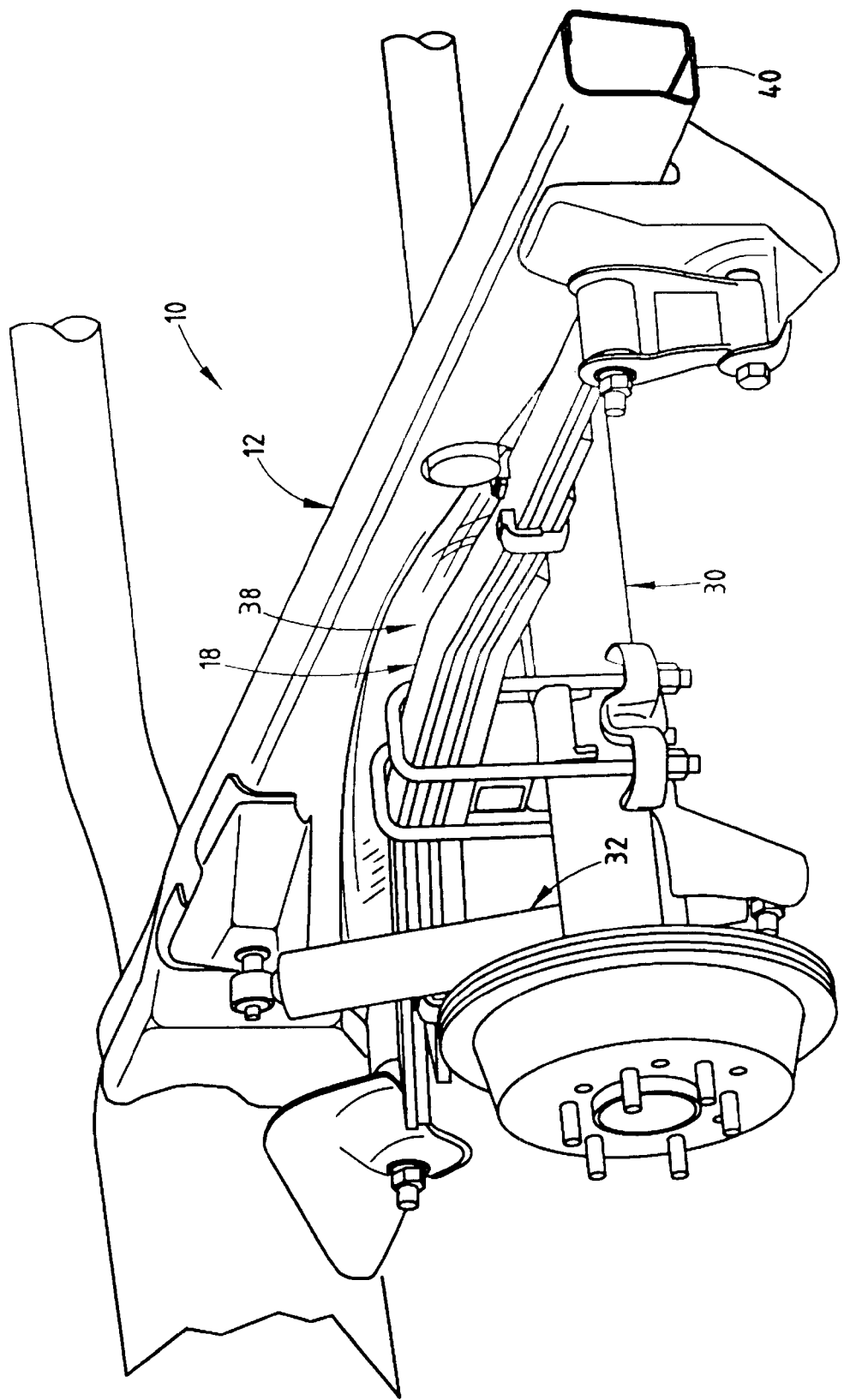
FIG. 10 is a perspective view of a rear axle suspension of the present invention when the suspension is at a top of jounce.

During normal operation of the vehicle having the vehicle frame 10 of the present invention, the leaf springs 18 will not rise above the bottom face 40 of the rear frame rails 12 (FIG. 9). However, when the vehicle encounters bumps in the road, the vehicle will experience jounce, or up and down movement. The jounce experienced by the vehicle will be translated to the axle housing 30, which will also move up and down. Because of the leaf springs 18, the axle housing 30 will be able to move relative to the rear frame rails 12. Therefore, the leaf springs 18 will move closer to the bottom face 40 of the rear frame rails 12 and sometimes to a level above the bottom face 40 of the rear frame rails 12 (see FIG. 10). Since the rear frame rails 12 include the notch 38 having the continuous arc between the front end connection point 56 of the leaf spring 18 and the rear end connection point of the leaf spring 56, the leaf spring 18 will be able to rise to a level above the bottom face 40 of the rear frame rails 12 without contacting the rear frame rails 12.

Consequently, because the rear frame rails 12 converge towards the rear of the vehicle and the front end 20 of the leaf spring 18 is connected to the bottom face 40 of its associated rear frame rails 12, the shock absorber 32 can be placed outside of the rear frame rails 12. With the addition of the shock absorbers 32 outside of the rear frame rails 12, the vehicle frame 10 provides the vehicle with an excellent ratio for roll damping and therefore excellent roll stability for the vehicle. Moreover, positioning the leaf springs 18 and shock absorbers 32 outside of an area between the rear frame rails 12 allows more fuel volume for the vehicle. Furthermore, since the leaf springs 18 are allowed to move to a level above the bottom face 40 of the rear frame rails 12, the body structure of the vehicle as used in the prior art does not have to be altered. Additionally, positioning the leaf springs 18 in the notch 38 of the rear frame rails 12 during jounce reduces the rotational movement of the vehicle about its longitudinal axis.

It will be readily appreciated by those skilled in the art that modifications may be made to the invention without departing from the concepts disclosed herein. such modifications are to be considered as included in the following claims, unless these claims by their language expressly state otherwise.

What is claimed is:

1. A rear frame axle suspension comprising:

a pair of rear frame rails;

a front bracket connected to each rear frame rail, each front bracket being connected to a bottom of the rear frame rails;

a rear bracket connected to each rear frame rail, each rear bracket being connected to an outside face of the rear frame rails;

a pair of leaf springs, each leaf spring being connected at a front end to the front bracket and at a rear end to the rear bracket, each leaf spring having a longitudinal direction between the front bracket and the rear bracket, the longitudinal directions of the leaf springs being non-parallel to the rear frame rails;

an axle housing connected to the leaf springs, the axle housing being adapted to contain at least one axle having an axis of rotation perpendicular to the leaf springs; and a pair of shock absorbers, each shock absorber connected to one of the rear frame rails at a first connection point and to the axle housing at a second connection point, the rear frame rails being located between the first connection points.

2. The rear frame axle suspension of claim 1, further including:

a differential case connected to the axle housing.

3. The rear frame axle suspension of claim 1, wherein:

each rear frame rail includes a front end and a rear end; and a rear distance between the rear ends of the rear frame rails is smaller than a front distance between the front ends of the rear frame rails.

4. The rear frame axle suspension of claim 3, wherein:

each rear frame rail includes an outside face, an inside face, a bottom face and a top face;

the rear frame rails each include a notch extending between the outside face of the rear frame rails and the bottom face of the rear frame rails, the notches allowing the leaf springs to rise to a level above the bottom face of the rear frames rail during jounce.

5. The rear frame axle suspension of claim 4, wherein:

the leaf spring is connected to the front bracket at a front end bracket connection point and to the rear bracket at a rear end bracket connection point; and a top portion of the notch is arcuate, an arc of the notch extending between the front end bracket connection point and the rear end bracket connection point.

6. The rear frame axle suspension of claim 5, wherein:

a front end height of the outside face between the top face and the bottom face of each rear frame rail at the front end of the rear frame rail is larger than a rear end height of the outside face between the top face and the bottom face of each rear frame rail at the rear end of the rear frame rail.

7. The rear frame axle suspension of claim 4, wherein:

the shock absorbers are connected to the outside face of the rear frame rails at the first connection point.

8. The rear frame axle suspension of claim 7, further including:

a differential case connected to the axle housing.

9. The rear frame axle suspension of claim 7, wherein:

a front end height of the outside face between the top face and the bottom face of each rear frame rail at the front end of the rear frame rail is larger than a rear end height of the outside face between the top face and the bottom face of each rear frame rail at the rear end of the rear frame rail.

10. The rear frame axle suspension of claim 7, wherein:

the leaf spring is connected to the front bracket at a front end bracket connection point and to the rear bracket at a rear end bracket connection point; and a top portion of the notch is arcuate, an arc of the notch extending between the front end bracket connection point and the rear end bracket connection point.

11. The rear frame axle suspension of claim 7, wherein:

each rear frame rail includes a front end and a rear end; and a rear distance between the rear ends of the rear frame rails is smaller than a front distance between the front ends of the rear frame rails. front distance between the front ends of the rear frame rails.

12. A rear frame axle suspension comprising:

a pair of rear frame rails, each rear frame rail being tubular and including an outside face, an inside face, a bottom face and a top face;

a front bracket and a rear bracket attached to each rear frame rail; and a pair of leaf springs, each leaf spring being connected at a front end to the front bracket at a front end bracket connection point and at a rear end to the rear bracket at a rear end bracket connection point for each rear frame rail, each leaf spring having a longitudinal direction between the front bracket and the rear bracket, the longitudinal direction of each leaf spring being non-parallel to the rear frame rails;

each rear frame rail including a notch extending between the outside face of the rear frame rails and the bottom face of the rear frame rails, the notches allowing the leaf springs to rise to a level above the bottom face of the rear frame rails during jounce.

13. The rear frame axle suspension of claim 12, further including:

an axle housing connected to the leaf springs, the axle housing being adapted to contain at least one axle having an axis of rotation perpendicular to the leaf springs; and a pair of shock absorbers, each shock absorber connected to one of the rear frame rails at a first connection point and to the axle housing at a second connection point, the rear frame rails being located between the first connection points to thereby reduce bowing of the rear frame rails.

14. A vehicle frame comprising:

a pair of rear frame rails, each rear frame rail including an outside face, an inside face, a bottom face and a top face;

a front bracket attached to each rear frame rail, each front bracket being connected to the bottom face of the rear frame rails;

a rear bracket attached to each rear frame rail, each rear bracket being connected to the outside face of the rear frame rails;

a pair of leaf springs, each leaf spring being connected at a front end of the leaf spring to the front bracket at a front end bracket connection point and at a rear end of the leaf spring to the rear bracket at a rear end bracket connection point, each leaf spring having a longitudinal direction between the front bracket and the rear bracket, the longitudinal directions of the leaf springs being non-parallel to the rear frame rails;

an axle housing connected to the leaf springs, the axle housing being adapted to contain at least one axle having an axis of rotation perpendicular to the leaf springs; and a pair of shock absorbers, each shock absorber connected to one of the rear frame rails at a first connection point and to the axle housing at a second connection point, the rear frame rails being located between the first connection points;

the rear frame rails each including a notch extending between the outside face of the rear frame rails and the bottom face of the rear frame rails, the notches allowing the leaf springs to rise to a level above the bottom face of the rear frame rails during jounce.

15. The vehicle frame of claim 14, wherein:

a top portion of the notch in the outside face is arcuate, an arc of the notch extending between the front end bracket connection point and the rear end bracket connection point.

16. The vehicle frame of claim 14, wherein:

each rear frame rail includes a front end and a rear end;

a front end height of the outside face between the top face and the bottom face of each rear frame rail at the front end of the rear frame rail is larger than a rear end height of the outside face between the top face and the bottom face of each rear frame rail at the rear end of the rear frame rail.

17. The vehicle frame of claim 14, further including:

a differential case connected to the axle housing.

18. The vehicle frame of claim 14, wherein:

each rear frame rail includes a front end and a rear end; and a rear distance between the rear ends of the rear frame rails is smaller than a front distance between the front ends of the rear frame rails.

19. The vehicle frame of claim 14, wherein:

the shock absorbers are connected to the outside face of the rear frame rails at the first connection point.

* * * * *